United States Patent [19]

Tsunoda

[11] Patent Number: 4,505,492
[45] Date of Patent: Mar. 19, 1985

[54] REAR SUSPENSION SYSTEM FOR MOTORCYCLES

[75] Inventor: Kazuhiko Tsunoda, Saitama, Japan

[73] Assignee: Honda Giken Kogyo Kabushiki Kaisha, Tokyo, Japan

[21] Appl. No.: 398,263

[22] Filed: Jul. 14, 1982

[30] Foreign Application Priority Data

Jul. 13, 1981 [JP] Japan .................. 56-109833

[51] Int. Cl.³ .................................. B62K 25/26
[52] U.S. Cl. ....................... 280/284; 180/227
[58] Field of Search ............. 180/227, 219; 280/284, 280/285, 286, 287, 278, 281 R, 274

[56] References Cited

U.S. PATENT DOCUMENTS 4,076,271  2/1978  Doncque ................. 180/227 X
4,322,088  3/1982  Miyakoshi et al. ............. 280/284
4,360,214  11/1982  Isono ........................ 280/284

FOREIGN PATENT DOCUMENTS 950983  10/1956  Fed. Rep. of Germany ...... 180/227
559614  6/1923  France ........................ 280/284

*Primary Examiner*—Joseph F. Peters, Jr.
*Assistant Examiner*—Mitchell J. Hill
*Attorney, Agent, or Firm*—Irving M. Weiner; Pamela S. Burt

[57] ABSTRACT

A rear suspension system for a motorcycle having a progressive damping characteristic. The rear suspension system includes a rear wheel support member having a truss structure including a front corner portion pivotally supported on a motorcycle body frame, a rear corner portion having a rear wheel supported thereon, and an upwardly closing top corner portion. Two link members are each pivotally supported on the body frame and are connected to each other, and a shock absorber is interposed between one of the two link members and the body frame. In accordance with such system, the unsprung load can be reduced to a relatively low level, and at the same time the degree of a progressive change of the damping force can be set to be relatively large.

2 Claims, 5 Drawing Figures

REAR SUSPENSION SYSTEM FOR MOTORCYCLES

BACKGROUND OF THE INVENTION

1. Field of the Invention

The present invention relates generally to a rear suspension system for motorcycles. More particularly, the invention relates to a rear suspension system for motorcycles which provides a progressive damping characteristic in response to up and down movements of a rear wheel of the motorcycle.

2. Description of Relevant Art

In a known conventional rear suspension system for motorcycles, a damping force of a shock absorber is relatively small within a range of relatively small rocking motion of a rear wheel supporting member and is relatively large within a range of relatively large rocking motion of the rear wheel supporting member. The rear wheel supporting member of such known rear suspension system has a rear wheel supported at a rear end thereof and is mounted at a forward end thereof for up and down rocking motion on a motorcycle body frame. One end of a link is pivotally mounted on the rear wheel supporting member while one end of another link is pivotally mounted on the body frame. The opposite ends of the two links are connected to each other, and a shock absorber having one end thereof connected to the body frame is connected at the other end thereof to either one of the two links.

According to such known rear suspension system, the damping force or the magnitude of compression of the shock absorber when the rear wheel supporting member is rocked upwardly to permit upward movements of the rear wheel in following undulations of a road surface, increases curvilinearly relative to a stroke of rocking motion of the rear wheel supporting member due to restricting actions of the two links upon the body frame, thereby providing a progressive damping force characteristic.

In such a conventional rear suspension system for motorcycles, the rear wheel supporting member must have a substantial weight in order for it to be sufficiently strong to bear a gradually increasing damping force, and accordingly the unsprung load of the motorcycle must undesirably be relatively large when compared with a rear suspension system which does not provide a progressive damping characteristic, thus requiring that a shock absorber having a large capacity and hence a great load be provided. In order to alleviate such situation, the degree of a progressive change of the damping force must be made relatively small.

The present invention effectively overcomes the foregoing problems attendant conventional rear suspension systems for motorcycles.

SUMMARY OF THE INVENTION

The present invention provides a rear suspension system for a motorcycle, comprising: a rear wheel supporting member having a truss structure including a front corner portion pivotally supported on a motorcycle body frame, a rear corner portion having a rear wheel supported thereon, and an upwardly closing top corner portion; a first link member having one end thereof pivotally supported on the aforesaid top corner portion; a second link having one end thereof connected to the other end of the first link and the other end thereof pivotally supported on the body frame; and a shock absorber having one end thereof connected to the body frame and the other end thereof connected to one of the first and second link members.

An object of the present invention resides in the provision of a rear suspension system for a motorcycle of the type which provides a progressive damping characteristic in response to up and down movements of a rear wheel, which system includes a rear wheel supporting member having a light weight and a sufficient strength, so as to allow the unsprung load of the motorcycle to be reduced to a relatively low level while at the same time permitting the degree of a progressive change of the damping force to be set to be relatively large.

The above and further objects, details and advantages of the present invention will become apparent from the following detailed description of preferred embodiments thereof when read in conjunction with the accompanying drawings.

DETAILED DESCRIPTION OF PREFERRED EMBODIMENTS

Figure 1:
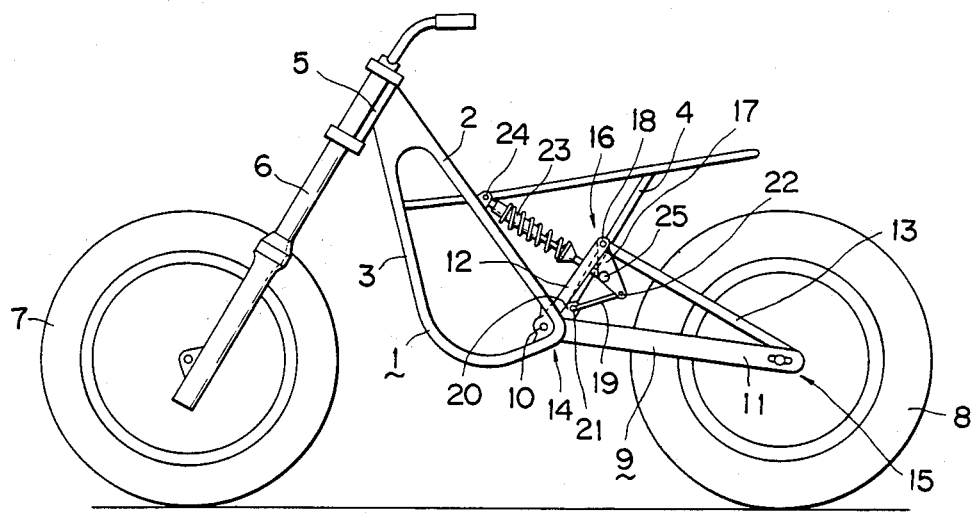
FIG. 1 is a schematic side elevational view of a motorcycle provided with a rear suspension system in accordance with a first embodiment of the present invention.

With reference to FIG. 1, there is illustrated a motorcycle which includes a body frame 1. The body frame 1 includes a main frame 2, a down tube 3, a rear frame 4, and other known structure. A head pipe 5 is fixed to a forward end of the body frame 1, and a telescopic type front fork 6 is mounted for pivotal motion in the head pipe 5 to provide steering operation for the motorcycle. A front wheel 7 is journalled at a lower part of the front fork 6, and a rear wheel 8 is journalled at a rear end of a rear fork 9. The rear fork 9 has a forward end thereof pivotally mounted on the body frame 1 by means of a pivot shaft 10 and thus comprises a rear wheel supporting member which is rocked up and down around the pivot shaft 10 to allow the rear wheel 8 to move up and down in following undulations of a road surface.

The rear fork 9 includes a relatively wide base frame 11 and relatively less wide subframes 12, 13 extending obliquely upwardly from forward and rearward ends of the base frame 11, respectively, and rear fork 9 is thus designed in the form of a sideward truss structure which is convexed upwardly at a position proximal the forward end thereof. The rear fork 9 includes a front corner portion 14 at which the base frame 11 and the front subframe 12 are joined together, and a rear corner portion 15 at which the base frame 11 and the rear subframe 13 are joined together. The front fork 9 is supported at the front corner portion 14 thereof for pivotal motion on the body frame 1, while the rear wheel 8 is supported at the rear corner portion 15 on the rear frame 9.

The rear fork 9 further includes a top corner portion 16 at which the front and rear subframes 12, 13 are joined together. A first link 17 having a substantially triangular shape in side elevation has a first angle portion thereof connected to the rear fork 9, by means of a pin 18, at the top corner portion 16 thereof, so as to be capable of forward and rearward rocking motion. On the other hand, a second link 19 in the form of a rod is connected by means of a pin 21 to a bracket 20 extending rearwardly from the body frame 1, so as to be capable of forward and rearward rocking motion. A lower rear end or second angle portion of the first link 17 and a top end of the second link 19 are connected with each other by means of a pin 22. A progressive link mechanism is thus defined by the thus connected first and second links 17 and 19.

A shock absorber 23 for damping movement of the rear wheel includes a spring and a pneumatic, hydraulic, or hydropneumatic damper, and has one end thereof pivotally mounted, by means of a pin 24, on the main frame 2 forming the body frame 1, so as to thus be capable of up and down rocking motion. The shock absorber 23 has the other end thereof connected to an intermediate portion in the vertical direction, i.e., a third angle portion, of the first link 17 by means of a pin 25. The shock absorber 23 is disposed in an inclined position wherein the rearward end thereof is lower than the forward end thereof.

The first and second links 17, 19 are both arranged so as to be disposed substantially within a triangle defined by the rear fork 9 in side elevation.

Figure 5:
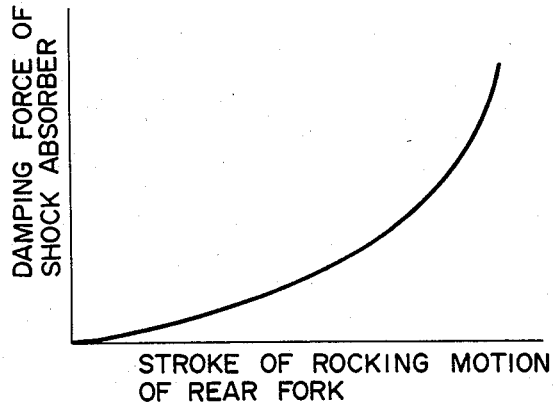
FIG. 5 is a diagrammatic representation generally illustrating a progressive damping characteristic of a motorcycle.

If the rear fork 9 is rocked upwardly around the pivot shaft 10 to allow the rear wheel 8 to be moved upwardly, the first link 17, which is in a restricted spaced relationship from the body frame 1 by virtue of its connection with the second link 19, will be rocked in a clockwise direction in FIG. 1 around the pin 18. Consequently, the magnitude of compression of the shock absorber 23 will not define a simple linearly proportional relationship to the stroke of rocking motion of the rear fork 9, but will be greater by the magnitude of rocking motion of the first link 17 added thereto. Thus, the damping force of the shock absorber 23 will define a progressive characteristic which increases curvilinearly as illustrated by the diagrammatic representation of FIG. 5.

Figure 2:
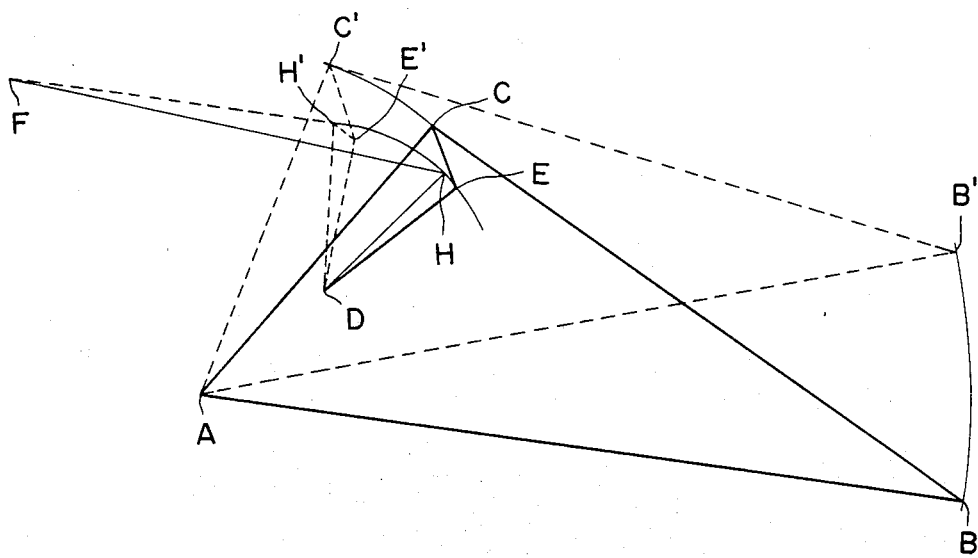
FIG. 2 is a chart representing operations of the rear suspension system of FIG. 1.

FIG. 2 is a diagrammatic representation illustrating a principle of compression of the shock absorber 23 in response to rocking motion of the rear fork 9. In FIG. 2, A indicates the point at which the rear fork 9 is pivotally mounted on the body frame 1 by the pivot shaft 10; B indicates the point at which the rear fork 9 supports the rear wheel 8; C the point at which the rear fork 9 is connected to the first link 17 by the pin 18; D the point at which the body frame 1 is connected to the second link 19 by the pin 21; E the point at which the first and second links 17, 19 are connected to each other by the pin 22; F the point at which the body frame 1 is connected to the shock absorber 23 by the pin 24; and H indicates the point at which the first link 17 is connected to the shock absorber 23 by the pin 25.

It is to be noted that the point D, i.e., the point at which the body frame 1 and the second link 19 are connected to each other, is always located rearwardly of a segment which interconnects the points A and C, i.e., a segment which interconnects the front corner portion 14 and the top corner portion 16 of the truss structure.

If the point B is moved to a position represented by B' due to upward rocking motion of the rear fork 9, the point C moves integrally along an arc to a position C' whereupon the point E which is restricted by the second link 19 moves along an arc around the center defined by the point D. It is to be noted that, in this instance, the movement of the point E is greater than the movement of the point C by an amount defined by the simultaneous pivotal movement of the first link 17, and thus the rocking speed of the point E is increased in a manner corresponding to that of the point C. Accordingly, in the meantime, an angle CED is expanded to another angle C'E'D and the distance $\overline{FH}$ is reduced to the distance $\overline{FH'}$. The reduction of such distance is provided by compression of the shock absorber 23 which thus provides a damping force corresponding to the compression of the rear fork 9. If, in the fully compressed position of the shock absorber 23 which is assumed to be represented by the position H' of the point H, an angle FH'D formed between an axis of the shock absorber 23 and a segment $\overline{DH'}$, which interconnects the point at which the first link 17 is connected to the shock absorber 23 and the point at which the second link 19 is connected to the body frame 1, is set to be a right angle or close to a right angle, because the shock absorber 23 is compressed by a rocking motion of the segment $\overline{DH'}$ around the point D, an increment of compression of the shock absorber 23 by an increment of the rocking motion of the segment $\overline{DH'}$ is relatively great when the shock absorber 23 is substantially near the fully compressed position thereof. Thus, the progressive characteristic of the damping force of the shock absorber 23 is made more effective by such arrangement.

It is to be noted that such a setting of the angle FH'D to be a right angle or close to a right angle when the shock absorber 23 is compressed to, or near to, the fully compressed position thereof, is attained by arrangement of the point D rearwardly of the segment $\overline{AC}$ as described hereinabove.

Figure 3:
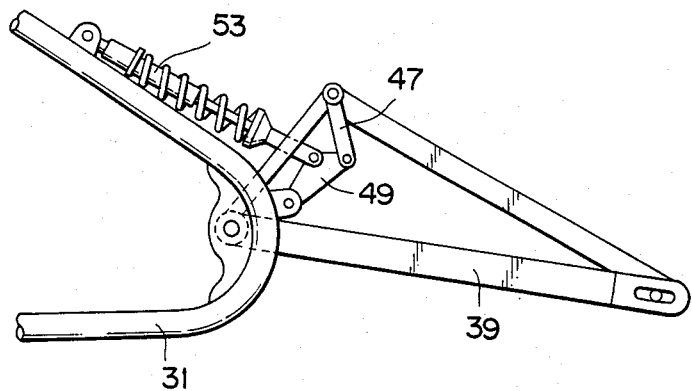
FIG. 3 is a side elevational view, in an enlarged scale, of a rear wheel suspension system for motorcycles in accordance with a second embodiment of the invention.

Referring now to FIG. 3 which shows a second embodiment of the invention, a first link 47 connected to a rear fork 39 comprises a linear rod member, while a second link 49 comprises a member having a substantially triangular shape in side elevation. A first angle portion of second link 49 is connected to the first link 47, and a second angle portion of second link 49 is connected to a body frame 31. A rear end of a shock absorber 53 is connected to a third angle portion of the second link 49. Thus, in this embodiment, the shock absorber 53 is in a reversed relationship to the first and second links in comparison with that of the above-described first embodiment of the invention.

In accordance with the second embodiment of the invention, the link 47 connected to the rear fork 39 can be made relatively light in weight and the unsprung load on the rear fork 39 side can also be reduced because the weight of the shock absorber 53 is supported by the link 40 on the body frame 31 side, thereby providing a further improvement in the ability of the rear wheel to follow undulations of a road surface.

Figure 4:
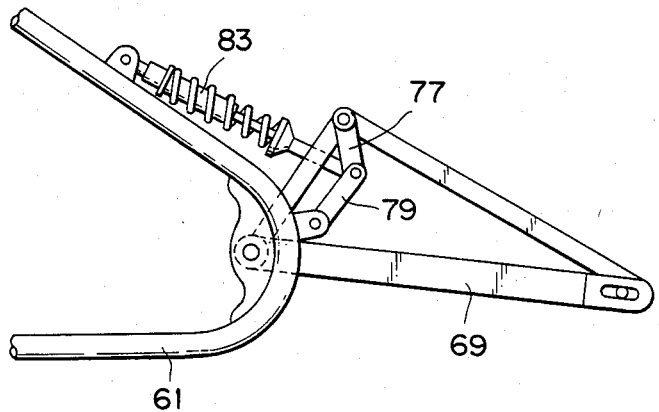
FIG. 4 is a side elevational view, in an enlarged scale, of a rear wheel suspension system for motorcycles in accordance with a third embodiment of the invention.

Referring now to FIG. 4 which shows a third embodiment of the invention, a rear fork 69, and first and second links 77, 79 connected to a body frame 61, each comprise a linear rod member. A rear end of a shock absorber 83 is commonly connected to a joint at which both links 77, 79 are interconnected. With such arrangement, an operational characteristic such as represented in FIG. 2 can be attained and the total weight of both links 77, 79 can be reduced.

It is to be noted that, in any of the foregoing embodiments, in addition to the above-described arrangement wherein the damping force of a shock absorber is relatively small within a range of small rocking motion of a rear fork while it is relatively large within a range of large rocking motion of the rear fork; and an angle corresponding to the angle FH'D of FIG. 2 when the shock absorber is positioned at, or near to, the fully compressed position thereof is set to be a right angle or close to a right angle, relatively short links may preferably be employed as the first and second links.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

I claim:

1. A rear suspension system for a motorcycle, comprising:

a rear wheel supporting member having a truss structure including a front corner portion pivotally supported on a motorcycle body frame, a rear corner portion having a rear wheel supported thereon, and a top corner portion;

first and second link members;

said first link member having a first end thereof pivotally supported on said top corner portion of said truss structure and a second end thereof connected to said second link member;

said second link member having a first end thereof connected to said second end of said first link member and a second end thereof pivotally supported on said body frame;

said first and second link members being disposed within an area defined by said truss structure of said rear wheel supporting member in side elevation;

a shock absorber having one end thereof pivotally supported on said body frame and the other end thereof connected to one of said first and second link members;

said second end of said second link member being located rearwardly of a straight line passing through said front corner portion and said top corner portion;

said rear wheel supporting member including a relatively wide base frame member which interconnects said front and rear corner portions, and relatively less wide front and rear subframe members which connect said front and rear corner portions to said top corner portion, respectively;

said front subframe member being shorter in length than said rear subframe member;

said second link member comprising a substantially triangular plate member; and said plate member being pivotally connected at a first angle portion defining said first end thereof to said first link member, at a second angle portion defining said second end thereof to said body frame, and at a third angle portion thereof to said shock absorber.

2. A rear suspension system according to claim 1, wherein:

said first link member comprises a rod member.

* * * * *